No. 725,466. PATENTED APR. 14, 1903.
C. W. METCALF.
ACETYLENE GAS GENERATOR.
APPLICATION FILED DEC. 19, 1902.
NO MODEL. 2 SHEETS—SHEET 1.

WITNESSES:
Robert Head
C. R. Ferguson

INVENTOR
Charles W. Metcalf
BY Munn
ATTORNEYS.

No. 725,466. PATENTED APR. 14, 1903.
C. W. METCALF.
ACETYLENE GAS GENERATOR.
APPLICATION FILED DEC. 19, 1902.
NO MODEL. 2 SHEETS—SHEET 2.

WITNESSES:
Robert Head
C. R. Ferguson

INVENTOR
Charles W. Metcalf
BY Munn
ATTORNEYS.

UNITED STATES PATENT OFFICE.

CHARLES W. METCALF, OF SAN DIEGO, CALIFORNIA.

ACETYLENE-GAS GENERATOR.

SPECIFICATION forming part of Letters Patent No. 725,466, dated April 14, 1903.

Application filed December 19, 1902. Serial No. 135,865. (No model.)

*To all whom it may concern:*

Be it known that I, CHARLES W. METCALF, a citizen of the United States, and a resident of San Diego, in the county of San Diego and State of California, have invented a new and Improved Acetylene-Gas Generator, of which the following is a full, clear, and exact description.

This invention relates to improvements in machines for generating gas from calcium carbid, the object being to provide a generator of simple construction and operating automatically to feed the carbid.

I will describe an acetylene-gas generator embodying my invention and then point out the novel features in the appended claims.

Figures 1, 2:
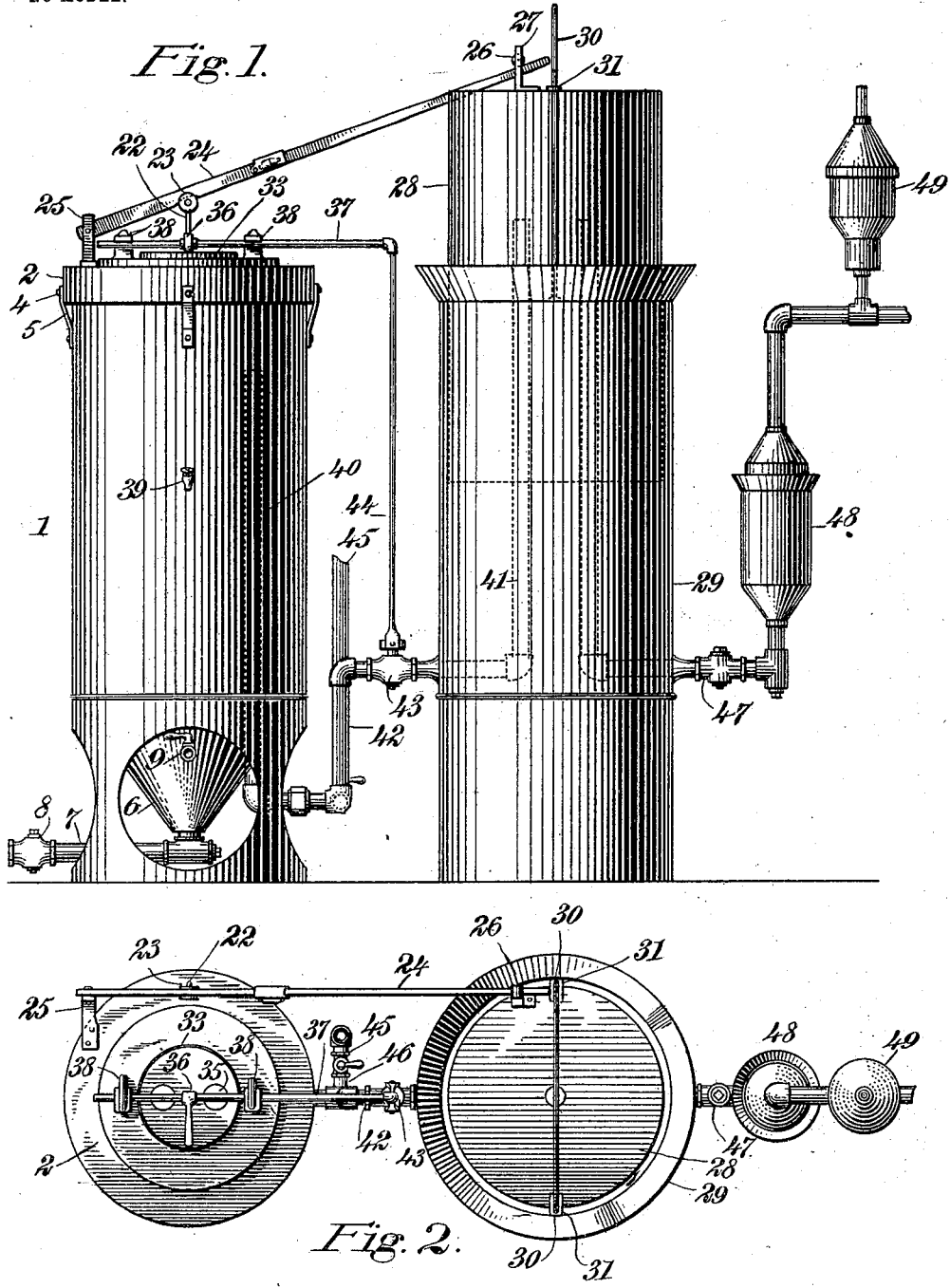
Figure 3:
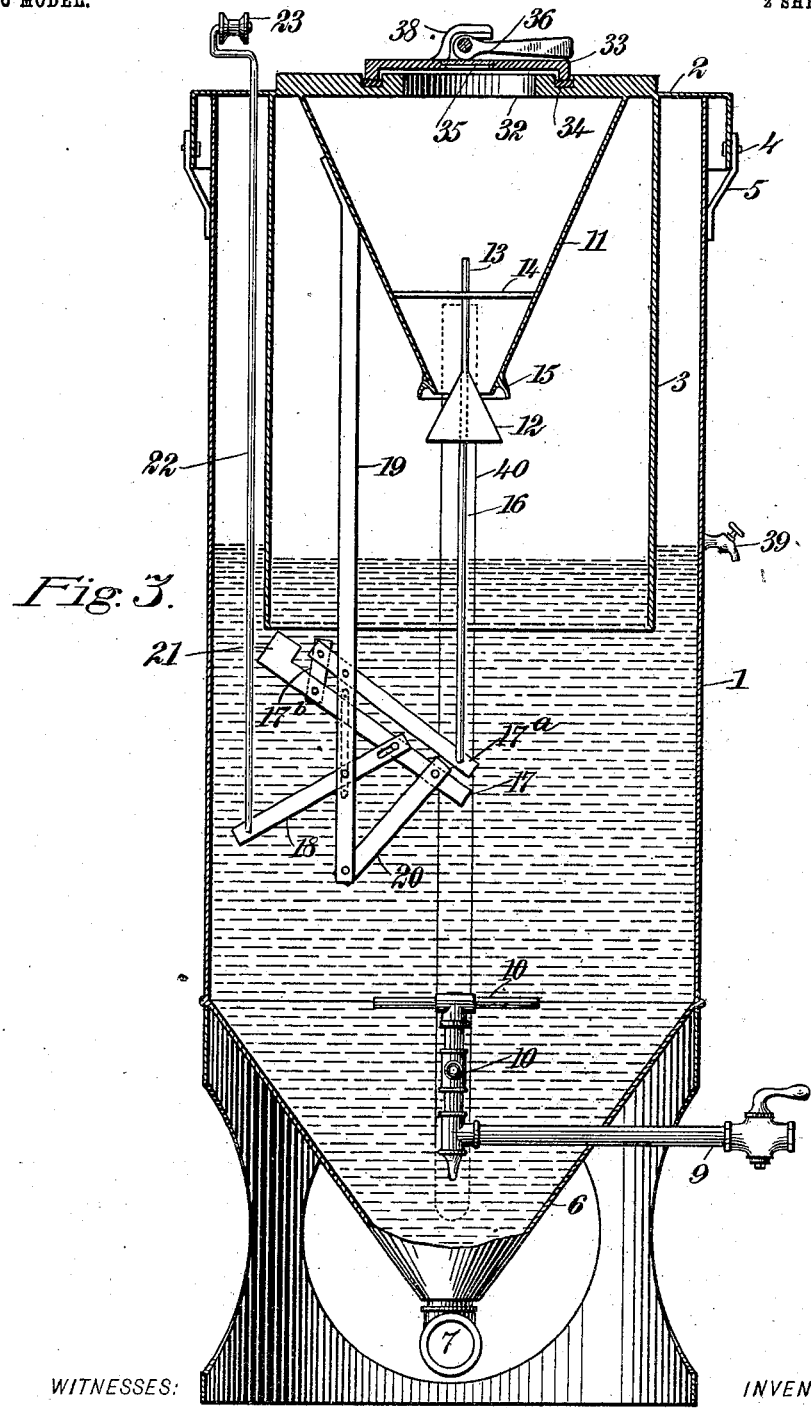

Figure 1 is a side elevation of an acetylene-gas generator embodying my invention. Fig. 2 is a plan view thereof, and Fig. 3 is a sectional view of the generating-tank.

The generator comprises a water-tank 1, having a cover 2, from which a cylinder 3 extends downward, the said cylinder being open at its lower end and the said lower end when the machine is in operation being extended into the water. The cover 2 is held in place by means of pins or bolts 4, passing through perforations in the annular flange of the cover and into openings in straps 5, attached to the tank 1. The lower end of the tank 1 is conical, as indicated at 6, and this conical portion communicates with an outlet-pipe 7, in which is a valve 8. The water is admitted to the tank through a pipe 9, which within the tank has a vertical portion, from which branches 10 extend. These branches are extended laterally and in different planes. This feed-pipe 9 not only serves for filling the tank, but it serves also to clean the tank of sediment, as by opening the valve 8 and permitting water to pass through the pipe 9 it is obvious that the force of water will carry all sediment from the funnel-shaped conical bottom out through pipe 7.

Arranged in the cylinder 3 is a hopper or holder 11 for the calcium carbid. This holder or hopper is open at the bottom, and the opening is controlled by a conical valve 12, from the upper end of which a rod 13 passes through a guide 14, secured to the inner side of the holder. Surrounding the lower end of the holder or hopper is a flange 15, which will serve to deflect any water of condensation that may gather on the outer side of the holder, thus preventing the water from reaching the valve, as water on the valve obviously would on coming in contact with the carbid generate gas. A valve-stem 16 extends downward from the valve 12 and connects pivotally with a lever $17^a$, the said lever $17^a$ having a link connection $17^b$ with a lever 17, which has pivotal sliding connections with a lever 18, pivoted to a hanger 19, here shown as extended downward from the holder or hopper 11, and the lever $17^a$ is also pivoted to said hanger. Between the valve-stem 16 and the lever 18 a link 20 forms a connection between the lower end of the hanger 19 and said lever 17. The outer end of the lever 17 is provided with a weight 21, the purpose of which is to force the lever downward to close the valve 12, as will be hereinafter described. A push-rod 22 extends from the end of the lever 18 through an opening in the cover 2, and on the upper end of this rod 22 is a roller 23, engaged by a lever 24, the said lever 24 being pivoted to a standard 25 on the cover 2, and its other end has engagement with a roller 26, mounted on a standard 27, connected to the gasometer-bell 28. This gasometer-bell 28 is movable in a fixed portion 29 of the gasometer and is guided by rods 30, extended upward from the fixed portion through openings in plates 31 on the bell. The lever 24 is made in two hinged sections, so that it may be folded one section upon the other when it is desired to remove the cover 2 for cleaning or other purposes. The cover 2 is provided with an opening 32, through which carbid is passed to the holder 11. This opening when the machine is in use is closed by a cover 33, the annular edge flange of which engages with a rubber gasket 34. The cover 33 is provided with sight-openings in which glass 35 is arranged. Through the glass it is obvious that the interior of the holder or hopper may be examined to ascertain when a new supply of carbid is to be placed therein. The cover 33 is clamped in place by means of an eccentric lever 36, mounted on a rod 37, designed to engage under keepers or hooks 38, attached to the cover 2. A faucet 39 is connected to the tank 1 at the desired water-line. By means of this faucet, when open, during the filling of the tank the proper amount or level will be indicated when the water runs out of the faucet.

The generated gas is carried to the gasometer through a pipe consisting of a section 40, extending upward in the generator and into the cylinder 3, and a section 41, extended upward in the gasometer above the water-line. These sections 40 and 41 are connected by a pipe 42, in which is a valve 43, from the stem of which a rod 44 extends to a connection with the rod 37. By this arrangement the cutting off of the passage of gas from the generator to the gasometer or from the gasometer to the generator will be permitted when it is desired to remove the cover 2 of the generator, as it is obvious that before the said cover can be removed the rod 37 must be swung out of engagement with the keepers or hooks 38, and therefore the valve will be turned to closed position. A discharge-pipe 45 leads from the pipe 42 for conducting gas from the generator to the gasometer to any desired point outside of the building. This pipe is provided with a valve 46, which obviously is closed when the machine is generating gas, but is to be opened when the valve 43 is closed, so that any gas escaping from the generator will pass outside of the building. A distributing-pipe 47 leads from the gasometer, and arranged in this pipe is a regulator and scrubber 48, and also connected with the said pipe is a safety-valve 49. As these two devices are not claimed in this application, it is not deemed necessary to show their interior construction.

In the operation after placing the water in the tank and then placing the carbid a portion of the carbid will fall into the water, because at this time the valve 12 will be slightly open, as the bell 28 will have operated the lever 24 to push downward on the rod 22, tipping the lever 17 and drawing the valve downward. When a certain amount of gas shall have passed into the gasometer, the bell will be raised, relieving the pressure on the rod 22, so that the weight 21 may rock the lever 17, causing the closing of the valve 12. Of course as the gas passes out of the gasometer to a certain extent the valve will be again opened to admit a fresh supply of calcium carbid.

Having thus described my invention, I claim as new and desire to secure by Letters Patent—

1. The combination with a gasometer, of a generator-tank, a cover for the tank and having an opening, a cover for said opening, a carbid-holder arranged to receive material passed through said opening, a rod having detachable connection with the first-named cover, clamping devices on said rod for securing the last-named cover in place, a pipe connection between the gasometer and the generator, a valve in said pipe, and a rod connection between the valve and the first-named rod, substantially as specified.

2. The combination with a gasometer, and a generator, of a carbid-holder arranged in the upper portion of the generator and having an open lower end, a valve for the opening, a hanger depending from the holder, a series of levers supported by the hanger and having operative connection with the valve, one of said levers being weighted, a push-rod extended from one of said levers through the top of the generator, and a lever connected with the outer end of said rod and with the gasometer-bell, substantially as specified.

3. In combination with a gasometer, a generator comprising a tank for water, a cylinder suspended in said tank, a carbid-holder arranged in the cylinder and having an open lower end, a conical valve, a guide for said valve, a cylinder, a weighted lever pivoted to said cylinder, a lever pivoted to the valve-stem and to the first-named lever, a hanger, a link connection between the lower end of said hanger and the weighted lever, another lever pivoted to the hanger and to said weighted lever, a push-rod extended from the said other lever through an opening in the top of the tank, a lever having swinging connection with the top of the tank and engaging with the said push-rod, and a connection between said lever and the gasometer-bell, substantially as specified.

4. A combination with a gasometer, of a generator comprising a tank, a cover for said tank, a cylinder attached to the cover within the tank, a carbid-holder arranged in the cylinder, the said cover having an opening for the passage of carbid to the holder, a cover for said opening, hooks on the first-named cover, a rod adapted for engagement with said hooks, an eccentric lever on said rod for engaging with the last-named cover, a pipe connection between the generator and gasometer, a valve in said connection, and a rod connecting said valve to the first-named rod, substantially as specified.

In testimony whereof I have signed my name to this specification in the presence of two subscribing witnesses.

CHARLES W. METCALF.

Witnesses:
HENRY S. MARVIN,
SAML. G. INGLE.